(12) United States Patent 
Park et al.

(10) Patent No.: US 12,572,463 B2 
(45) Date of Patent: Mar. 10, 2026

(54) STORAGE DEVICE AND OPERATING METHOD OF THE STORAGE DEVICE

(71) Applicant: SAMSUNG ELECTRONICS CO., LTD., Suwon-si (KR)

(72) Inventors: Jin Yong Park, Suwon-si (KR); Jung Ho Park, Suwon-si (KR); In-Su Kim, Suwon-si (KR); Jun Yeong Seok, Suwon-si (KR); Jae Yong Jeong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 18/735,671

(22) Filed: Jun. 6, 2024

(65) Prior Publication Data

US 2025/0165391 A1 May 22, 2025

(30) Foreign Application Priority Data

Nov. 20, 2023 (KR) ......................... 10-2023-0161032

(51) Int. Cl. 
G06F 12/02 (2006.01)

(52) U.S. Cl. 
CPC .. G06F 12/0246 (2013.01); *G06F 2212/7201* (2013.01)

(58) Field of Classification Search 
CPC ......... G06F 12/0246; G06F 2212/7201; G06F 2212/1016; G06F 2212/1044; G06F 2212/7205; G06F 2212/7207; G06F 2212/7208 
See application file for complete search history.

(56) References Cited

U.S. PATENT DOCUMENTS

| | | | |
|---|---|---|---|
| 10,409,715 B2 | 9/2019 | Bae et al. | |
| 10,496,284 B1 | 12/2019 | Himelstein et al. | |
| 10,540,274 B2 | 1/2020 | Szubbocsev | |
| 10,657,047 B2 | 5/2020 | Lin | |
| 10,929,303 B2 | 2/2021 | Chung | |
| 11,513,949 B2 | 11/2022 | Lai et al. | |
| 2021/0064548 A1* | 3/2021 | Grosz | G06F 12/0246 |

(Continued)

FOREIGN PATENT DOCUMENTS

| | | |
|---|---|---|
| CN | 109189605 A | 1/2019 |
| CN | 115470155 A | 12/2022 |
| CN | 115729478 A | 3/2023 |

OTHER PUBLICATIONS

Extended European Search Report in European Appln. No. 24183389. 6, mailed on Nov. 28, 2024, 16 pages.

*Primary Examiner* — Masud K Khan 
(74) *Attorney, Agent, or Firm* — Fish & Richardson P.C.

(57) ABSTRACT

A storage device and an operating method of the storage device are provided. The storage device comprises a non-volatile memory including a virtual block including an L2P pair region storing a pair of a logical page number (LPN) and a physical page number (PPN) (LPN-PPN pair) and a data region storing data addressed to the PPN, a volatile memory including an L2V table storing a virtual block number (VBN) corresponding to the LPN, an L2P cache storing the LPN-PPN pair, and an LPN range map storing a portion of the LPN stored in the L2P pair region of the virtual block, and a controller configured to control the non-volatile memory and the volatile memory.

20 Claims, 16 Drawing Sheets

10

(56) References Cited

U.S. PATENT DOCUMENTS

| | | | |
|---|---|---|---|
| 2022/0147252 A1* | 5/2022 | Liu | ........................ G06F 9/4401 |
| 2022/0300432 A1 | 9/2022 | Subbarao | |
| 2023/0153238 A1 | 5/2023 | Kang | |
| 2024/0045799 A1* | 2/2024 | Cariello | .............. G06F 12/0246 |
| 2024/0220144 A1* | 7/2024 | Gohain | ................. G06F 3/0659 |

* cited by examiner

Figure 9:
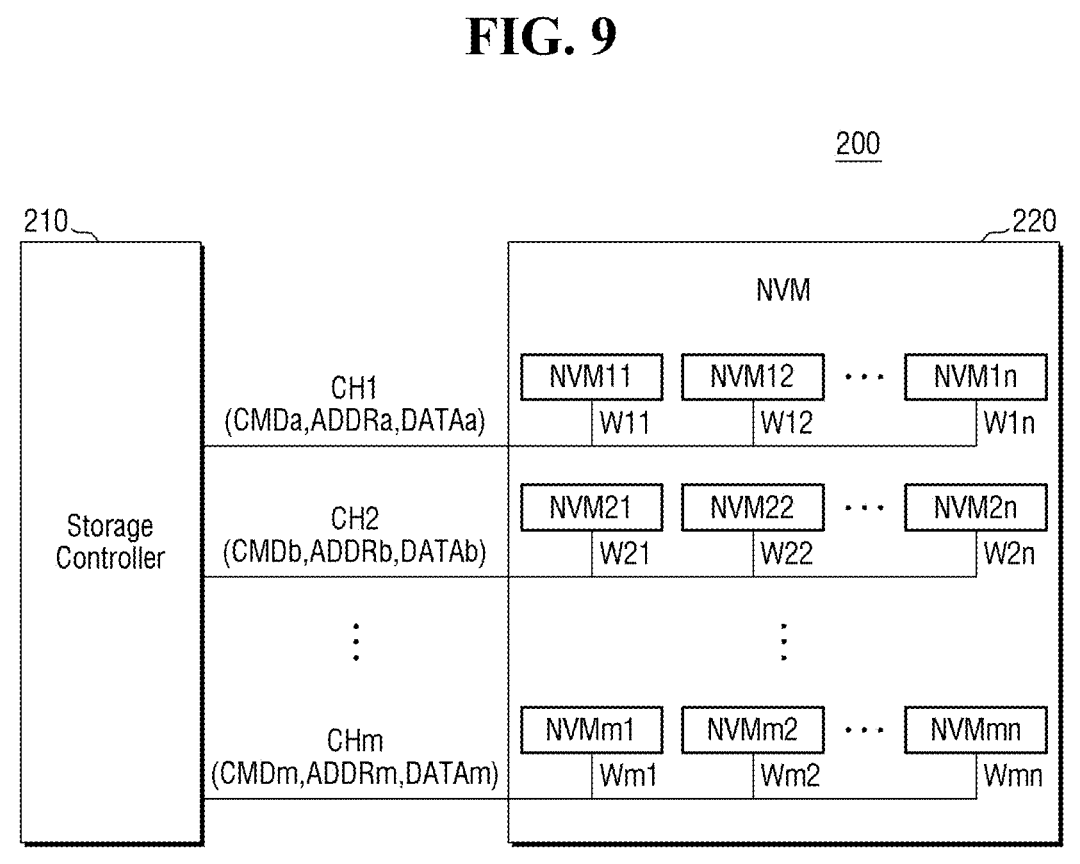

Storage Controller

NVM

CH1
(CMDa,ADDRa,DATAa)

| NVM11 | NVM12 | ・・・ | NVM1n |
| W11 | W12 | | W1n |

CH2
(CMDb,ADDRb,DATAb)

| NVM21 | NVM22 | ・・・ | NVM2n |
| W21 | W22 | | W2n |

CHm
(CMDm,ADDRm,DATAm)

| NVMm1 | NVMm2 | ・・・ | NVMmn |
| Wm1 | Wm2 | | Wmn |

BLKi

OLD BLOCK

NEW BLOCK

Figure 18:
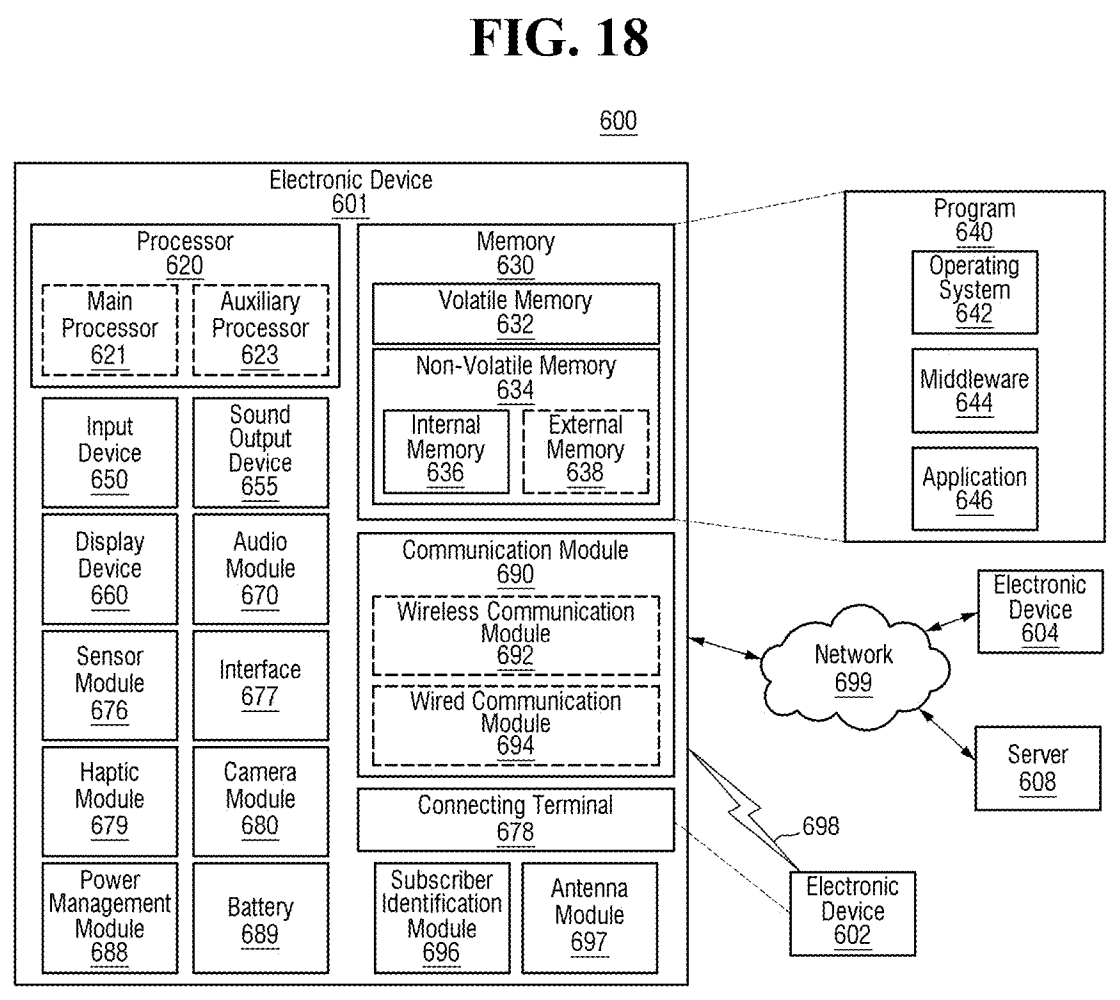

Electronic Device 601

Processor 620
- Main Processor 621
- Auxiliary Processor 623

Memory 630
- Volatile Memory 632
- Non-Volatile Memory 634
  - Internal Memory 636
  - External Memory 638

Program 640
- Operating System 642
- Middleware 644
- Application 646

Input Device 650

Sound Output Device 655

Display Device 660

Audio Module 670

Sensor Module 676

Interface 677

Haptic Module 679

Camera Module 680

Power Management Module 688

Battery 689

Communication Module 690
- Wireless Communication Module 692
- Wired Communication Module 694

Connecting Terminal 678

Subscriber Identification Module 696

Antenna Module 697

698

Network 699

Electronic Device 602

Electronic Device 604

Server 608

STORAGE DEVICE AND OPERATING METHOD OF THE STORAGE DEVICE

CROSS-REFERENCE TO RELATED APPLICATION

This application claims priority to Korean Patent Application No. 10-2023-0161032 filed on Nov. 20, 2023 in the Korean Intellectual Property Office, the disclosure of which is incorporated herein by reference in its entirety.

BACKGROUND

A storage device receives a logical page number (LPN) from a host device, determines a physical page number (PPN) therein corresponding to the LPN, and stores data. Accordingly, logical page number to physical page number (L2P) conversion is an important operation in the storage device.

As demands for capacities of storage devices increase, the sizes of L2P maps used for L2P conversion has gradually increased. This makes additional DRAM for L2P desired but weakens price competitiveness of the storage device.

SUMMARY

The present disclosure provides a storage device capable of improving performance of a storage device while implementing an L2P map in an on-demand loading manner, and an operating method of the storage device. In some implementations, the storage device has reduced DRAM usage compared to other storage devices. The L2P map in the disclosed storage device can be implemented in an on-demand loading manner that reduces DRAM usage, by using L2P map garbage collection (GC) that maintains the L2P map to be up to date. The present disclosure also provides methods for an L2P map GC that avoid degrading random write performance of the storage device.

In a first general aspect, a storage device comprises: a non-volatile memory including a virtual block including an L2P pair region storing a pair of a logical page number (LPN) and a physical page number (PPN) (LPN-PPN pair) and a data region storing data addressed to the PPN, a volatile memory including a logical page number to virtual block number (L2V) table storing a virtual block number (VBN) corresponding to the LPN, an L2P cache storing the LPN-PPN pair, and an LPN range map storing a portion of the LPN stored in the L2P pair region of the virtual block, and a controller configured to control the non-volatile memory and the volatile memory.

In a second general aspect, a storage device comprises: a non-volatile memory including a first virtual block and a second virtual block, a volatile memory, and a controller connected to the non-volatile memory and the volatile memory, wherein each of the first and second virtual blocks include an L2P pair region storing a pair of a logical page number (LPN) and a physical page number (PPN) (LPN-PPN pair) and a data region storing data addressed to the PPN, when the controller determines a garbage collection for the first virtual block, the controller migrates a valid LPN-PPN pair stored in the L2P pair region of the first virtual block to the L2P pair region of the second virtual block, and migrates valid data stored in the data region of the first virtual block to the data region of the second virtual block.

In a third general aspect, an operating method of a storage device which includes a volatile memory, a non-volatile memory including a virtual block having an L2P pair region storing an LPN-PPN pair and a data region storing data addressed to the PPN, and a controller for controlling the volatile memory and the non-volatile memory, comprises: receiving a write command, which instructs to write first data in a region addressed to a first LPN, from a host device, determining a position addressed to a first PPN of the virtual block addressed to a first VBN as a position for storing the first data, storing a pair of the first LPN and the first VBN in an L2V table of the volatile memory and storing a pair of the first LPN and the first PPN in an L2P cache of the volatile memory, based on the determined result, storing the first data in a position addressed to the first PPN of the virtual block, and when it is determined that the virtual block is full based on the LPN-PPN pair stored in the L2P cache and the data stored in the data region of the virtual block, flushing the LPN-PPN pair stored in the L2P cache to the L2P pair region of the virtual block.

In a fourth general aspect, an operating method of a storage device which includes a volatile memory including an L2P cache in which a first LPN-PPN pair is stored, a non-volatile memory including a virtual block having an L2P pair region storing a second LPN-PPN pair and a data region storing data addressed to the PPN, and a controller for controlling the volatile memory and the non-volatile memory, comprises: receiving a read command, which instructs to read data stored in a region addressed to a first LPN, from a host device, determining whether the first LPN is present in the L2P cache of the volatile memory, determining a PPN corresponding to the first LPN in the L2P cache in response to the first LPN being present in the L2P cache and returning data, which is stored in a position addressed to the determined PPN, to the host device, and determining a PPN corresponding to the first LPN in the second LPN-PPN pair of the L2P pair region of the virtual block in response to the first LPN for not being present in the L2P cache and returning data, which is stored in a position addressed to the determined PPN, to the host device.

BRIEF DESCRIPTION OF THE DRAWINGS

FIG. 1 is a block diagram illustrating an example of a memory system.

FIG. 9 is a view illustrating that a storage controller and a non-volatile memory of a storage device of FIG. 1 are reconfigured.

FIG. 12 is a view illustrating an example of a 3D V-NAND structure applicable to a non-volatile memory.

FIG. 18 is a block diagram illustrating an example of an electronic device.

DETAILED DESCRIPTION OF THE DISCLOSURE

Figure 1:
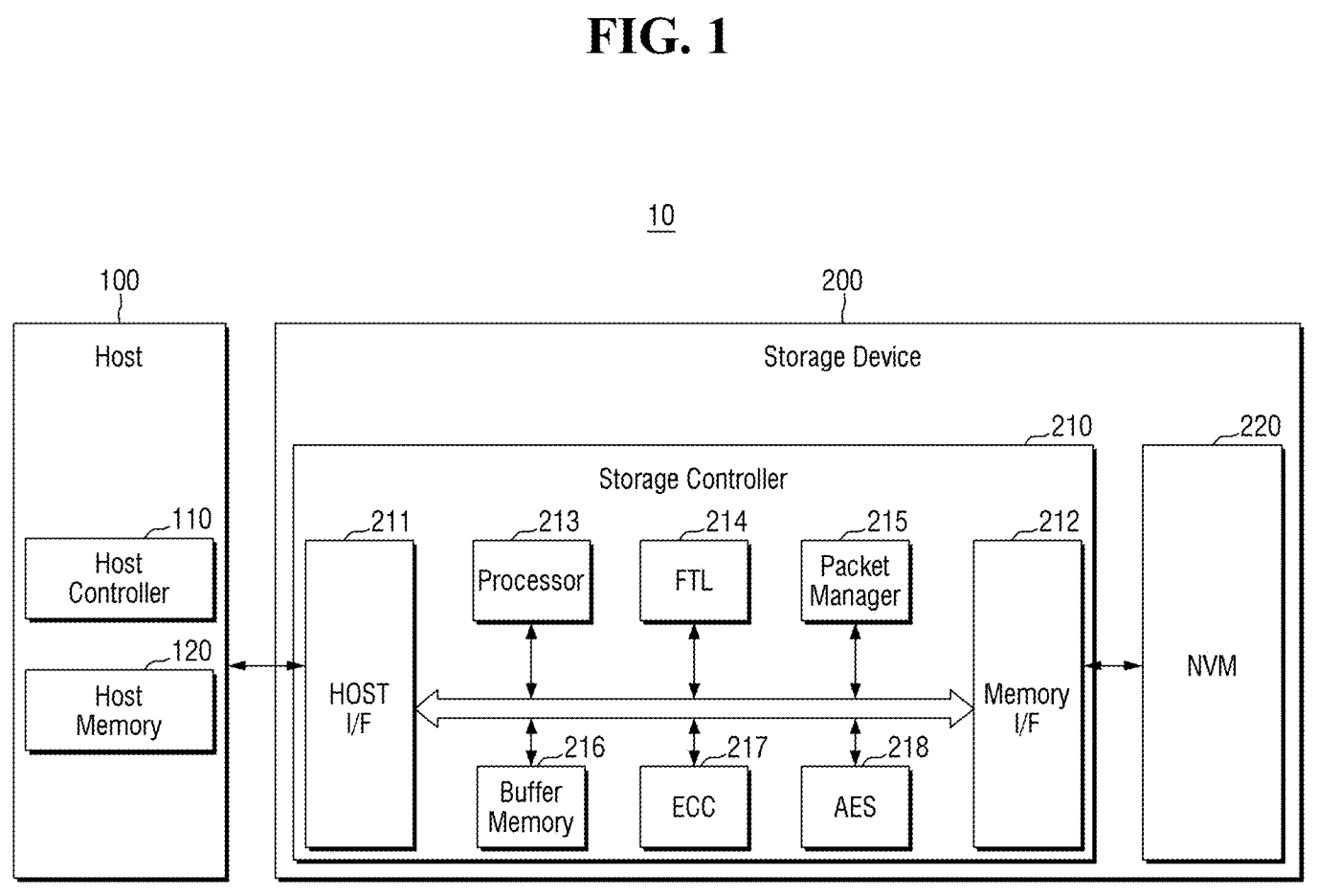
Figure 2:
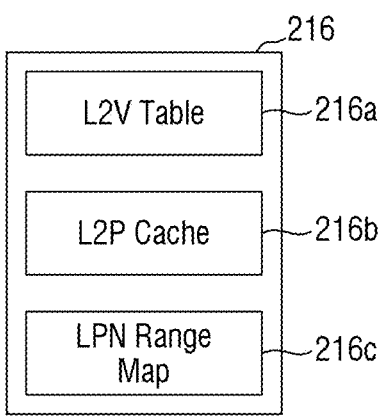
FIG. 2 is a block diagram illustrating an example of a buffer memory of the memory system FIG. 1.

FIG. 1 is a view illustrating an example of a memory system.

Referring to FIG. 1, a memory system 10 includes a host device 100 and a storage device 200. Also, the storage device 200 may include a storage controller 210 and a non-volatile memory (NVM) 220. In some implementations, the host device 100 may include a host controller 110 and a host memory 120. The host memory 120 may serve as a buffer memory for temporarily storing data to be transmitted to the storage device 200 or data transmitted from the storage device 200.

The storage device 200 may include storage media for storing data in accordance with a request from the host device 100. As an example, the storage device 200 may include at least one of a solid-state drive (SSD), an embedded memory, or a detachable external memory. When the storage device 200 is a SSD, the storage device 200 may be a device that complies with a non-volatile memory express (NVMe) standard.

When the storage device 200 is an embedded memory or the external memory, the storage device 200 may be a device that complies with a universal flash storage (UFS) standard or an embedded multi-media card (eMMC) standard. Each of the host device 100 and the storage device 200 may generate and transmit packets according to a standard protocol that is employed.

When the non-volatile memory 220 of the storage device 200 includes a flash memory, the flash memory may include a 2D NAND memory array or a 3D (or vertical) NAND (VNAND) memory array. As another example, the storage device 200 may include other various types of non-volatile memories. For example, the storage device 200 may include a magnetic random access memory (MRAM), a spin-transfer torque MRAM, a Conductive Bridging RAM (CBRAM), a Ferroelectric RAM (FeRAM), a Phase RAM (PRAM), a Resistive RAM and other various types of memories.

In some implementations, the host controller 110 and the host memory 120 may be implemented as separate semiconductor chips. Also, in some implementations, the host controller 110 and the host memory 120 may be integrated in the same semiconductor chip. As an example, the host controller 110 may be any one of a plurality of modules provided in an application processor AP, and the application processor may be implemented as a system on chip (SoC). In addition, the host memory 120 may be an embedded memory provided in the application processor, or a non-volatile memory or a memory module disposed outside the application processor.

The host controller 110 may store data (e.g., write data) of a buffer region in the non-volatile memory 220, or may manage an operation of storing data (e.g., read data) of the non-volatile memory 220 in the buffer region.

The storage controller 210 may include a host interface 211, a memory interface 212, and a processor 213. In addition, the storage controller 210 may further include a flash translation layer (FTL) 214, a packet manager 215, a buffer memory 216, an error correction code (ECC) engine 217, and an advanced encryption standard (AES) engine 218.

The storage controller 210 may further include a working memory in which the flash translation layer (FTL) 214 is loaded, and a data write and read operation for the non-volatile memory 220 may be controlled by execution of the flash translation layer 214 by the processor 213.

The host interface 211 may transmit and receive packets to and from the host device 100. The packets transmitted from the host device 100 to the host interface 211 may include a command or data to be written in the non-volatile memory 220, and the packets transmitted from the host interface 211 to the host device 100 may include a response to the command or data read from the non-volatile memory 220.

The memory interface 212 may transmit data to be written in the non-volatile memory 220 to the non-volatile memory 220 or receive data read from the non-volatile memory 220. The memory interface 212 may be implemented to comply with a standard regulation such as toggle or ONFI.

The flash translation layer 214 may perform various functions such as address mapping, wear-leveling, and garbage collection. The address mapping operation is an operation of changing a logical address received from a host to a physical address used to actually store data in the non-volatile memory 220. In some implementations, this L2P conversion operation may be performed with reference to an L2P cache 216b and an LPN range map 216c, which are stored in the buffer memory 216, and an L2P pair region stored in the non-volatile memory 220.

The wear-leveling is a technique for allowing blocks in the non-volatile memory 220 to be uniformly used to prevent a specific block from being excessively degraded and may be implemented through firmware technology for balancing erase counts of physical blocks by way of example. The garbage collection is a technique for ensuring that there is sufficient available capacity in the non-volatile memory 220 through a method of copying valid data of a block to a new block and then erasing the existing block.

The packet manager 215 may generate packets according to a protocol of an interface negotiated with the host device 100 or parse various kinds of information from the packets received from the host device 100.

The buffer memory 216 may temporarily store data to be written in the non-volatile memory 220 or data to be read from the non-volatile memory 220. The buffer memory 216 may be provided in the storage controller 210, but may be disposed outside the storage controller 210 in accordance with embodiments. In some implementations, the buffer memory may include a volatile memory, but the present disclosure is not limited thereto.

Hereinafter, the buffer memory 216 according to the example in FIG. 1 will be described in more detail with reference to FIGS. 2 to 5.

Figure 3:
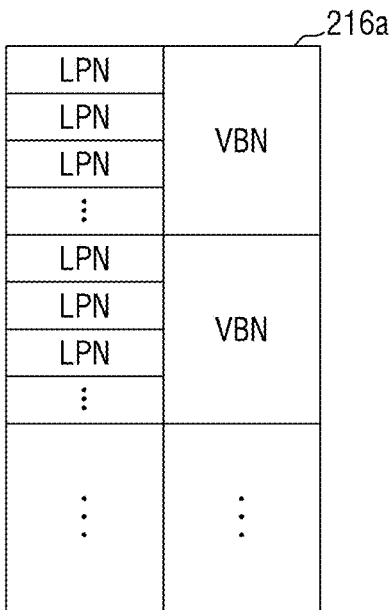
FIG. 3 is a view illustrating an example of an L2V table of the buffer memory FIG. 2.
Figure 4:
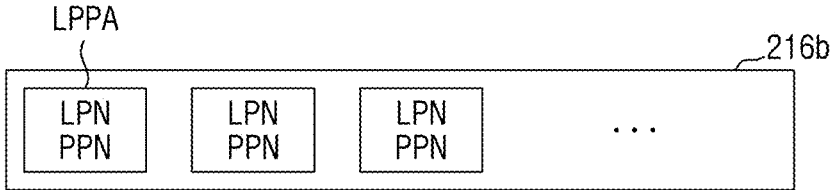
FIG. 4 is a view illustrating an example of an L2P cache of the buffer memory FIG. 2.
Figure 5:
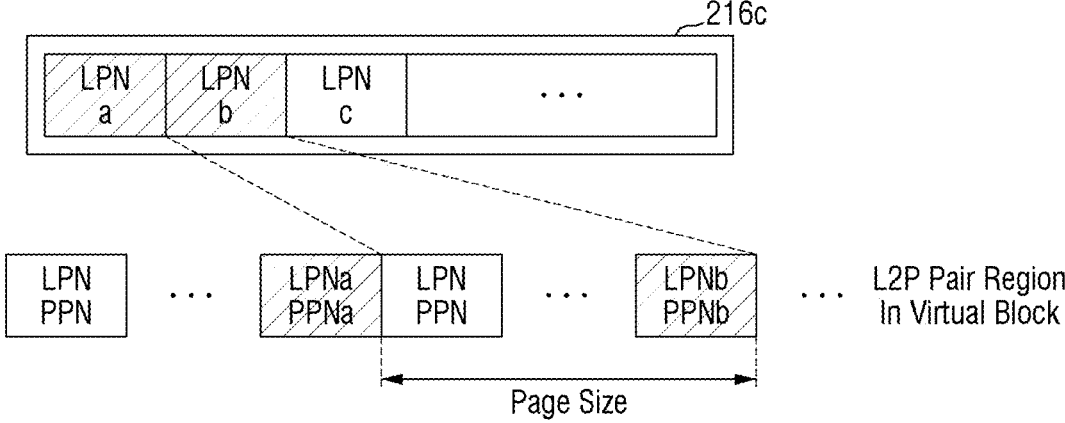
FIG. 5 is a view illustrating an example of an LPN range map of the buffer memory FIG. 2.

FIG. 2 is a block diagram illustrating a buffer memory of from the memory system 10 of FIG. 1. FIG. 3 is a view illustrating an L2V table of FIG. 2. FIG. 4 is a view illustrating an L2P cache of FIG. 2. FIG. 5 is a view illustrating an LPN range map of FIG. 2.

First, referring to FIG. 2, the buffer memory 216 includes an L2V table 216a, an L2P cache 216b and an LPN range map 216c, which constitute an L2P map used for L2P conversion.

Referring to FIG. 3, the L2V table 216a includes a virtual block number (VBN) of the non-volatile memory 220, which corresponds to the LPN received from the host device 100.

Figure 6:
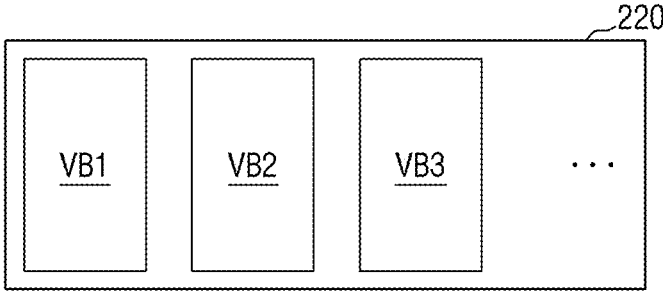
FIGS. 6 to 8 are views illustrating an example of a non-volatile memory of the memory system FIG. 1.

The non-volatile memory 220 may include a plurality of virtual blocks as shown in FIG. 6, and each VBN may indicate each virtual block. Each LPN corresponding to each VBN may be stored in the L2V table 216a as shown.

Referring to FIG. 4, the L2P cache 216b stores a PPN pair (hereinafter, LPN-PPN pair (LPPA)) corresponding to the LPN received from the host device 100. In the present embodiment, the L2P cache 216b may store the LPN-PPN pair LPPA for a virtual block that is not closed. In this case, the closing of the virtual block means that the storage capacity assigned to the virtual block is full.

As will be described later, the LPN-PPN pair LPPA for a closed virtual block is stored in an L2P pair region of the virtual block, and the LPN-PPN pair LPPA for a virtual block that is not closed may be stored in the L2P cache 216b.

Referring to FIG. 5, the LPN range map 216c stores a portion of the LPN stored in the L2P pair region of the closed virtual block. For example, the LPN range map 216c may store, for example, the last LPN of each page when the LPNs stored in the L2P pair region of the closed virtual block are divided into portions of a page size.

As will be described later, since the LPNs stored in the L2P pair region of the virtual block are aligned and stored in accordance with a predetermined reference (for example, an ascending order), the last LPN value of each page may be the largest value among LPN values of a page to which the corresponding LPN belongs.

For example, in the example shown in FIG. 5, the LPN range map 216c may store LPNa, which is the largest value among the LPN values stored in a first page of the L2P pair region of the virtual block, and LPNb, which is the largest value among the LPN values stored in a second page thereof. A detailed method for configuring the LPN range map 216c will be described later.

Referring back to FIG. 1, the ECC engine 217 may perform an error detection and correction function for read data read from the non-volatile memory 220. For example, the ECC engine 217 may generate parity bits for write data to be written in the non-volatile memory 220, and the parity bits generated as described above may be stored in the non-volatile memory 220 together with the write data. When the data are read from the non-volatile memory 220, the ECC engine 217 may correct an error of the read data by using the parity bits read from the non-volatile memory 220 together with the read data and may output the error-corrected read data.

In some implementations, the ECC engine 217 may perform error correction by using a low density parity check (LDPC) code. For example, the ECC engine 217 may perform error correction decoding based on the data read from the non-volatile memory 220. The ECC engine 217 may determine whether the error correction decoding is successful and output an indication signal in accordance with the determined result. In some implementations, the ECC engine 217 may perform error correction by using coded modulation such as a Bose-Chaudhri-Hocquenghem (BCH) code, a Turbo code, a Reed-Solomon code, a convolution code, a recursive systematic code (RSC), a Trellis Coded Modulation (TCM), and a Block Coded Modulation (BCM).

The AES engine 218 may perform at least one of an encryption operation or a decryption operation for the data input to the storage controller 210 by using a symmetric-key algorithm.

Hereinafter, the configuration of the non-volatile memory 220 according to the present embodiment will be described in more detail with reference to FIGS. 6 to 8.

Figure 7:
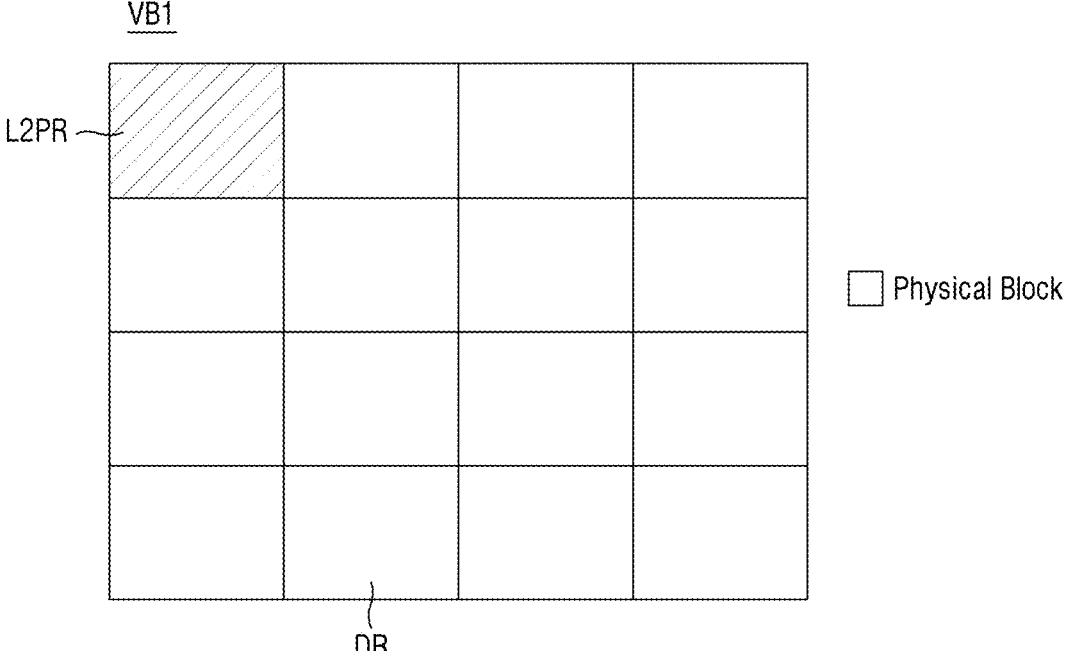
Figure 8:
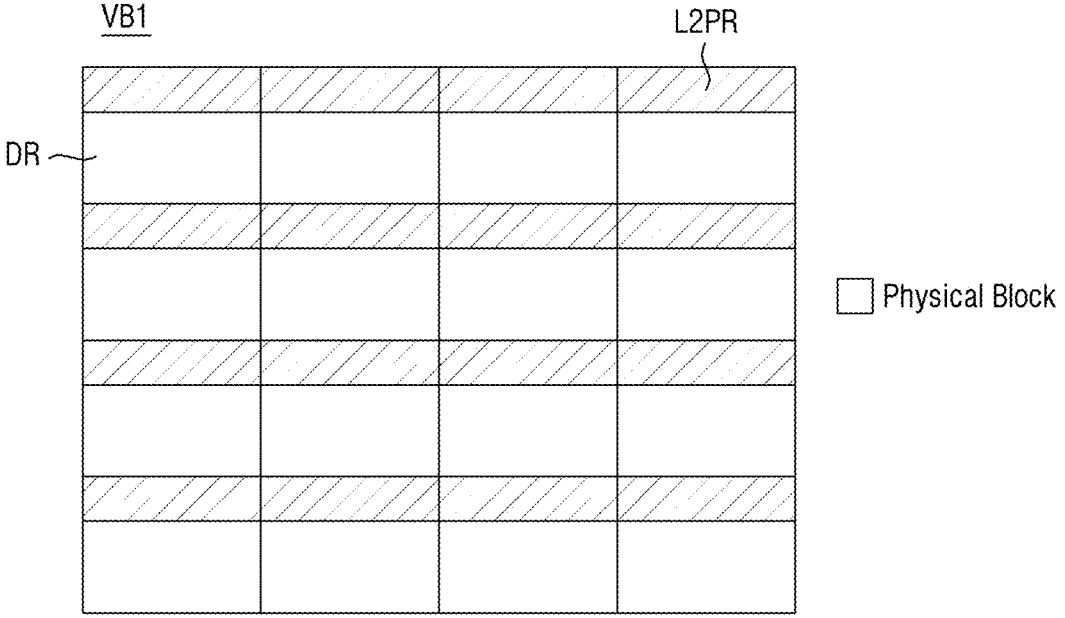

FIGS. 6 to 8 are views illustrating the non-volatile memory of FIG. 1.

First, referring to FIG. 6, the non-volatile memory 220 may include a plurality of virtual blocks VB1 to VB3. As described above, each of the virtual blocks VB1 to VB3 may be indicated by the VBN.

Referring to FIG. 7, in some implementations, the virtual block VB1 may include a plurality of physical blocks. One of the plurality of physical blocks may be assigned to the L2P pair region L2PR for storing the LPN-PPN pair. Physical blocks, which are not assigned to the L2P pair region L2PR, among the plurality of physical blocks included in the virtual block VB1 may be assigned to a data region DR for storing data.

In some implementations, the plurality of physical blocks may include an SLC block including a Single Level Cell (SLC) and an MLC block including a Multi Level Cell (MLC). The SLC block may be assigned to the L2P pair region L2PR, and the MLC block may be assigned to the data region DR.

Next, referring to FIG. 8, in some implementations, the virtual block VB1 may include a plurality of physical blocks. Each physical block may include a first portion connected to an SLC word line and a second portion connected to an MLC word line. The first portion of each physical block may be assigned to the L2P pair region L2PR for storing the LPN-PPN pair, and the second portion of each physical block may be assigned to the data region DR for storing data.

Also, in some implementations, the virtual block VB1 may include a plurality of physical blocks. Each physical block may include an SLC sub-block including an SLC and an MLC sub-block including an MLC. The SLC sub-block of each physical block may be assigned to the L2P pair region L2PR for storing the LPN-PPN pair, and the MLC sub-block of each physical block may be assigned to the data region DR for storing data.

FIG. 9 is a block diagram that a storage controller and a non-volatile memory of the storage device of FIG. 1 are reconfigured.

Referring to FIG. 9, the storage device 200 includes a non-volatile memory 220 and a storage controller 210. The storage device 200 may support a plurality of channels CH1 to CHm, and the non-volatile memory 220 and the storage controller 210 may be connected to each other through the plurality of channels CH1 to CHm. For example, the storage device 200 may be implemented as a storage device such as a solid state drive (SSD).

The non-volatile memory 220 may include a plurality of non-volatile memory devices NVM11 to NVMmn. Each of the non-volatile memory devices NVM11 to NVMmn may be connected to one of the plurality of channels CH1 to CHm through a corresponding way. For example, the non-volatile memory devices NVM11 to NVM1n may be connected to the first channel CH1 through ways W11 to W1n, and the non-volatile memory devices NVM21 to NVM2n may be connected to the second channel CH2 through ways W21 to W2n. In some implementations, each of the non-volatile memory devices NVM11 to NVMmn may be implemented in any memory unit capable of operating in accordance with an individual command from the storage controller 210. For example, each of the non-volatile memory devices NVM11 to NVMmn may be implemented as a chip or a die, but the present disclosure is not limited thereto.

The storage controller 210 may transmit and receive signals to and from the non-volatile memory 220 through the plurality of channels CH1 to CHm. For example, the storage controller 210 may transmit commands CMDa to CMDm, addresses ADDRa to ADDRm and data DATAa to DATAm to the non-volatile memory 220 through the channels CH1 to CHm, or may receive the data DATAa to DATAm from the non-volatile memory 220.

The storage controller 210 may select one of the non-volatile memory devices connected to a corresponding channel through each channel and may transmit and receive signals to and from the selected non-volatile memory device. For example, the storage controller 210 may select the non-volatile memory device NVM11 from the non-volatile memory devices NVM11 to NVM1*n* connected to the first channel CH1. The storage controller 210 may transmit the command CMDa, the address ADDRa and the data DATAa to the selected non-volatile memory device NVM11 through the first channel CH1, or may receive the data DATAa from the selected non-volatile memory device NVM11.

The storage controller 210 may transmit and receive signals to and from the non-volatile memory 220 in parallel through different channels. For example, the storage controller 210 may transmit the command CMDb to the non-volatile memory 220 through the second channel CH2 while transmitting the command CMDa to the non-volatile memory 220 through the first channel CH1. For example, the storage controller 210 may receive the data DATAb from the non-volatile memory 220 through the second channel CH2 while receiving the data DATAa from the non-volatile memory 220 through the first channel CH1.

The storage controller 210 may control an overall operation of the non-volatile memory 220. The storage controller 210 may control each of the non-volatile memory devices NVM11 to NVMmn connected to the channels CH1 to CHm by transmitting a signal to the channels CH1 to CHm. For example, the storage controller 210 may control a selected one of the non-volatile memory devices NVM11-NVM1*n* by transmitting the command CMDa and the address ADDRa to the first channel CH1.

Each of the non-volatile memory devices NVM11 to NVMmn may operate under the control of the storage controller 210. For example, the non-volatile memory device NVM11 may program (or write) the data DATAa in accordance with the command CMDa, the address ADDRa and the data DATAa, which are provided to the first channel CH1. For example, the non-volatile memory device NVM21 may read the data DATAb in accordance with the command CMDb and the address ADDRb, which are provided to the second channel CH2, and may transmit the read data DATAb to the storage controller 210.

Although FIG. 9 shows that the non-volatile memory 220 performs communication with the storage controller 210 through 'm' number of channels and the non-volatile memory 220 includes 'n' number of non-volatile memory devices corresponding to each channel, various modifications may be made in the number of channels and the number of non-volatile memory devices connected to one channel.

Figure 10:
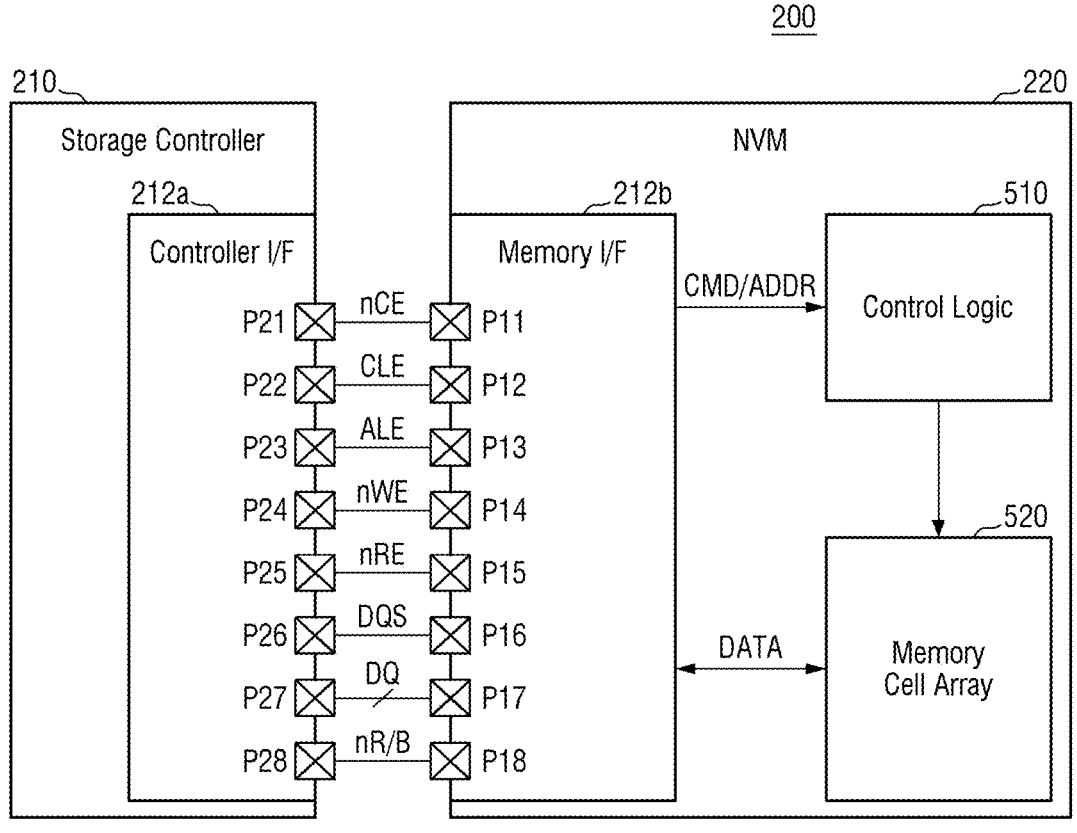
FIG. 10 is a view illustrating that a storage controller, a memory interface and a non-volatile memory of FIG. 1 are reconfigured.

FIG. 10 is a view illustrating that a storage controller, a memory interface, and a non-volatile memory of FIG. 1 are reconfigured. The memory interface 212 of FIG. 1 may include a controller interface circuit 212*a* of FIG. 10.

The non-volatile memory 220 may include first to eighth pins P11 to P18, a memory interface circuit 212*b*, a control logic circuit 510, and a memory cell array 520.

The memory interface circuit 212*b* may receive a chip enable signal nCE from the storage controller 210 through the first pin P11. The memory interface circuit 212*b* may transmit and receive signals to and from the storage controller 210 through the second to eighth pins P12 to P18 in accordance with the chip enable signal nCE. For example, when the chip enable signal nCE is in an enable state (e.g., low level), the memory interface circuit 212*b* may transmit and receive the signals to and from the storage controller 210 through the second to eighth pins P12 to P18.

The memory interface circuit 212*b* may receive a command latch enable signal CLE, an address latch enable signal ALE and a write enable signal nWE from the storage controller 210 through the second to fourth pins P12 to P14. The memory interface circuit 212*b* may receive a data signal DQ from the storage controller 210 or transmit the data signal DQ to the storage controller 210 through the seventh pin P17. The command CMD, the address ADDR and the data DATA may be transferred through the data signal DQ. For example, the data signal DQ may be transferred through a plurality of data signal lines. In this case, the seventh pin P17 may include a plurality of pins corresponding to a plurality of data signals.

The memory interface circuit 212*b* may acquire the command CMD from the data signal DQ received at an enable period (e.g., high level state) of the command latch enable signal CLE based on toggle timings of the write enable signal nWE. The memory interface circuit 212*b* may acquire the address ADDR from the data signal DQ received at an enable period (e.g., high level state) of the address latch enable signal ALE based on the toggle timings of the write enable signal nWE.

In some implementations, the write enable signal nWE may maintain a static state (e.g., high level or low level) and then toggle between the high level and the low level. For example, the write enable signal nWE may toggle at a period at which the command CMD or the address ADDR is transmitted. Therefore, the memory interface circuit 212*b* may acquire the command CMD or the address ADDR based on the toggle timings of the write enable signal nWE.

The memory interface circuit 212*b* may receive the read enable signal nRE from the storage controller 210 through the fifth pin P15. The memory interface circuit 212*b* may receive the data strobe signal DQS from the storage controller 210 or transmit the data strobe signal DQS to the storage controller 210 through the sixth pin P16.

In a data DATA output operation of the non-volatile memory 220, the memory interface circuit 212*b* may generate a read enable signal nRE toggling through the fifth pin P15 before outputting the data DATA. The memory interface circuit 212*b* may generate a data strobe signal DQS toggling based on toggling of the write enable signal nRE. For example, the memory interface circuit 212*b* may generate a data strobe signal DQS that starts to toggle after a predetermined delay (for example, tDQSRE) based on a toggling start time of the read enable signal nRE. The memory interface circuit 212*b* may transmit the data signal DQ including data DATA based on the toggle timing of the data strobe signal DQS. Therefore, the data DATA may be aligned at the toggle timing of the data strobe signal DQS and then transmitted to the storage controller 210.

In a data DATA input operation of the non-volatile memory 220, when the data signal DQ including data DATA is received from the storage controller 210, the memory interface circuit 212b may receive a data strobe signal DQS toggling with the data DATA from the storage controller 210. The memory interface circuit 212b may acquire the data DATA from the data signal DQ based on the toggle timing of the data strobe signal DQS. For example, the memory interface circuit 212b may acquire the data DATA by sampling the data signal DQ at a rising edge and a falling edge of the data strobe signal DQS.

The memory interface circuit 212b may transmit a ready/busy output signal nR/B to the storage controller 210 through the eighth pin P18. The memory interface circuit 212b may transmit state information of the non-volatile memory 220 to the storage controller 210 through the ready/busy output signal nR/B. When the non-volatile memory 220 is in a busy state (that is, when internal operations of the non-volatile memory 220 are being performed), the memory interface circuit 212b may transmit the ready/busy output signal nR/B indicating a busy state to the storage controller 210. When the non-volatile memory 220 is in a ready state (that is, when internal operations of the non-volatile memory 220 are completed or are not performed), the memory interface circuit 212b may transmit the ready/busy output signal nR/B indicating a ready state to the storage controller 210.

For example, while the non-volatile memory 220 reads the data DATA from the memory cell array 520 in response to a page read command, the memory interface circuit 212b may transmit the ready/busy output signal nR/B indicating a busy state (e.g., low level) to the storage controller 210. For example, while the non-volatile memory 220 programs the data DATA to the memory cell array 520 in response to a program command, the memory interface circuit 212b may transmit the ready/busy output signal nR/B indicating a busy state to the storage controller 210.

The control logic circuit 510 may control various operations of the non-volatile memory 220. The control logic circuit 510 may receive the command/address CMD/ADDR acquired from the memory interface circuit 212b. The control logic circuit 510 may generate control signals for controlling other elements of the non-volatile memory 220 in accordance with the received command/address CMD/ADDR. For example, the control logic circuit 510 may generate various control signals for programming the data DATA in the memory cell array 520 or reading the data DATA from the memory cell array 520.

The memory cell array 520 may store the data DATA acquired from the memory interface circuit 212b under the control of the control logic circuit 510. The memory cell array 520 may output the stored data DATA to the memory interface circuit 212b under the control of the control logic circuit 510.

The memory cell array 520 may include a plurality of memory cells. For example, the plurality of memory cells may be flash memory cells, but the present disclosure is not limited thereto. The memory cells may be resistive random access memory (RRAM) cells, ferroelectric random access memory (FRAM) cells, phase change random access memory (PRAM) cells, thyristor random access memory (TRAM) cells, and magnetic random access memory (MRAM) cells. Hereinafter, various examples will be described for memory cells that are NAND flash memory cells.

The storage controller 210 may include first to eighth pins P21 to P28 and a controller interface circuit 212a. The first to eighth pins P21 to P28 may correspond to the first to eighth pins P11 to P18 of the non-volatile memory 220.

The controller interface circuit 212a may transmit the chip enable signal nCE to the non-volatile memory 220 through the first pin P21. The controller interface circuit 212a may transmit and receive signals to and from the non-volatile memory 220, which is selected through the chip enable signal nCE, through the second to eighth pins P22 to P28.

The controller interface circuit 212a may transmit the command latch enable signal CLE, the address latch enable signal ALE and the write enable signal nWE to the non-volatile memory 220 through the second to fourth pins P22 to P24. The controller interface circuit 212a may transmit the data signal DQ to the non-volatile memory 220 or receive the data signal DQ from the non-volatile memory 220 through the seventh pin P27.

The controller interface circuit 212a may transmit the data signal DQ, which includes the command CMD or the address ADDR, to the non-volatile memory 220 together with the toggling write enable signal nWE. The controller interface circuit 212a may transmit the data signal DQ, which includes the command CMD, to the non-volatile memory 220 in accordance with transmission of the command latch enable signal CLE having an enable state, and may transmit the data signal DQ, which includes the address ADDR, to the non-volatile memory 220 in accordance with transmission of the address latch enable signal ALE having an enable state.

The controller interface circuit 212a may transmit the read enable signal nRE to the non-volatile memory 220 through the fifth pin P25. The controller interface circuit 212a may receive the data strobe signal DQS from the non-volatile memory 220 or transmit the data strobe signal DQS to the non-volatile memory 220 through the sixth pin P26.

In the data DATA input operation of the non-volatile memory 220, the controller interface circuit 212a may generate the toggling read enable signal nRE and may transmit the read enable signal nRE to the non-volatile memory 220. For example, the controller interface circuit 212a may generate the read enable signal nRE that is changed from a static state (e.g., high level or low level) to a toggle state before the data DATA is output. Therefore, the toggling data strobe signal DQS may be generated by the non-volatile memory 220 based on the read enable signal nRE. The controller interface circuit 212a may receive the data signal DQ, which includes the data DATA, from the non-volatile memory 220 together with the toggling data strobe signal DQS. The controller interface circuit 212a may acquire the data DATA from the data signal DQ based on the toggle timing of the data strobe signal DQS.

In the data DATA input operation of the non-volatile memory 220, the controller interface circuit 212a may generate the toggling data strobe signal DQS. For example, the controller interface circuit 212a may generate a data strobe signal DQS that is changed from a static state (e.g., high level or low level) to a toggle state before transmitting the data DATA. The controller interface circuit 212a may transmit the data signal DQ, which includes the data DATA, to the non-volatile memory 220 based on toggle timings of the data strobe signal DQS.

The controller interface circuit 212a may receive the ready/busy output signal nR/B from the non-volatile memory 220 through the eighth pin P28. The controller interface circuit 212a may determine state information of the non-volatile memory 220 based on the ready/busy output signal nR/B.

Figure 11:
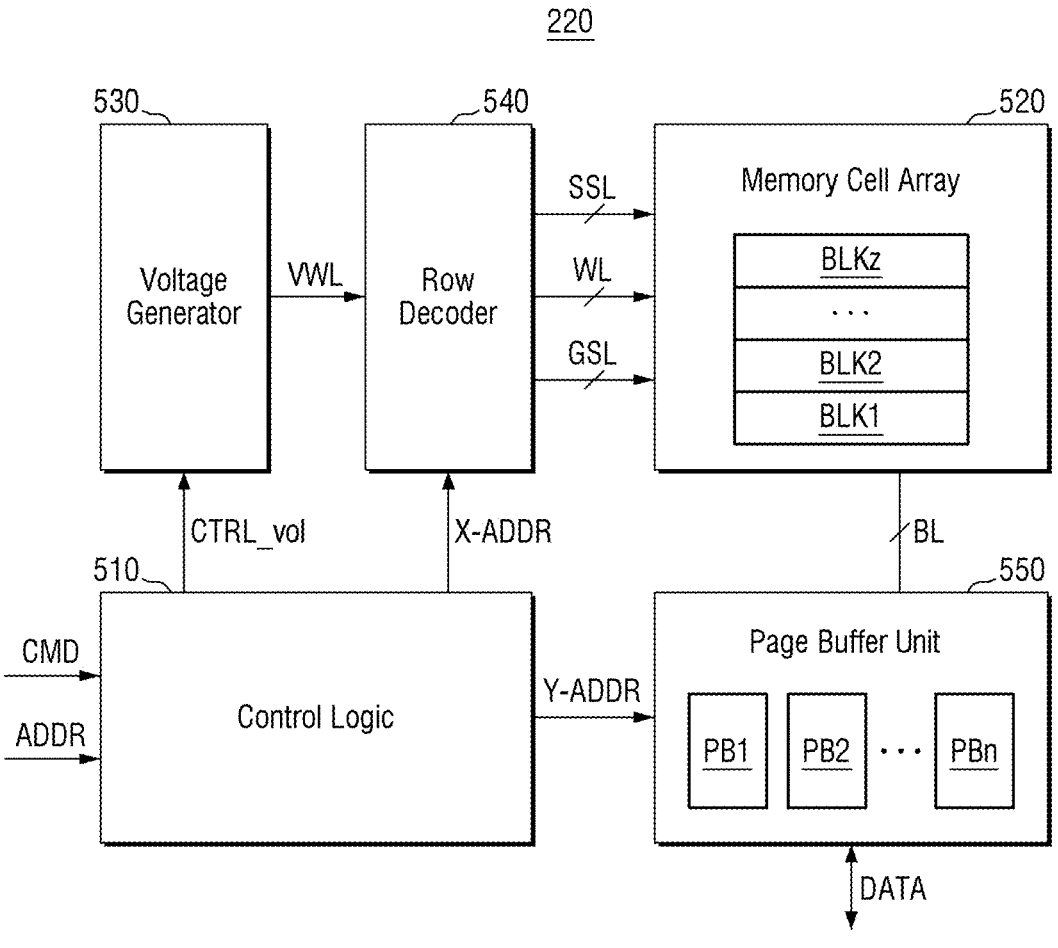
FIG. 11 is an example of a block diagram illustrating a non-volatile memory of FIG. 10.

FIG. 11 is an example of a block diagram illustrating a non-volatile memory of FIG. 10.

Referring to FIG. 11, the non-volatile memory 220 includes a control logic circuit 510, a memory cell array 520, a page buffer unit 550, a voltage generator 530, and a row decoder 540. Although not shown in FIG. 11, the non-volatile memory 220 may further include a memory interface circuit 212b shown in FIG. 10, and may further include a column logic, a pre-decoder, a temperature sensor, a command decoder, an address decoder, and the like.

The control logic circuit 510 may generally control various operations within the non-volatile memory 220. The control logic circuit 510 may output various control signals in response to the command CMD and/or the address ADDR from the memory interface circuit (212b of FIG. 10). For example, the control logic circuit 510 may output a voltage control signal CTRL_vol, a row address X-ADDR, and a column address Y-ADDR.

The memory cell array 520 may include a plurality of memory blocks BLK1 to BLKz (z is a positive integer), each of which may include a plurality of memory cells. The memory cell array 520 may be connected to the page buffer unit 550 through bit lines BL and may be connected to the row decoder 540 through word lines WL, string selection lines SSL, and ground selection lines GSL.

In some implementations, the memory cell array 520 may include a three-dimensional memory cell array, wherein the three-dimensional memory cell array may include a plurality of NAND strings. Each NAND string may include memory cells respectively connected to word lines vertically stacked on a substrate. In some implementations, the memory cell array 520 may include a two-dimensional memory cell array, wherein the two-dimensional memory cell array may include a plurality of NAND strings disposed along row and column directions.

The page buffer unit 550 may include a plurality of page buffers PB1 to PBn (n is an integer greater than or equal to 3), wherein the plurality of page buffers PB1 to PBn may be respectively connected with the memory cells through the bit lines BL. The page buffer unit 550 may select at least one of the bit lines BL in response to the column address Y-ADDR. The page buffer unit 550 may operate as a write driver or a sense amplifier in accordance with an operation mode. For example, during a program operation, the page buffer unit 550 may apply a bit line voltage corresponding to data, which will be programmed, to the selected bit line. During a read operation, the page buffer unit 550 may sense a current or voltage of the selected bit line to sense data stored in the memory cell.

The voltage generator 530 may generate various types of voltages for performing program, read, and erase operations based on the voltage control signal CTRL_vol. For example, the voltage generator 530 may generate a program voltage, a read voltage, a program verification voltage, an erase voltage and the like as word line voltages VWL.

The row decoder 540 may select one of the plurality of word lines WL in response to the row address X-ADDR, and may select one of the plurality of string selection lines SSL. For example, the row decoder 540 may apply the program voltage and the program verification voltage to the selected word line during the program operation, and may apply the read voltage to the selected word line during the read operation.

Figure 12:
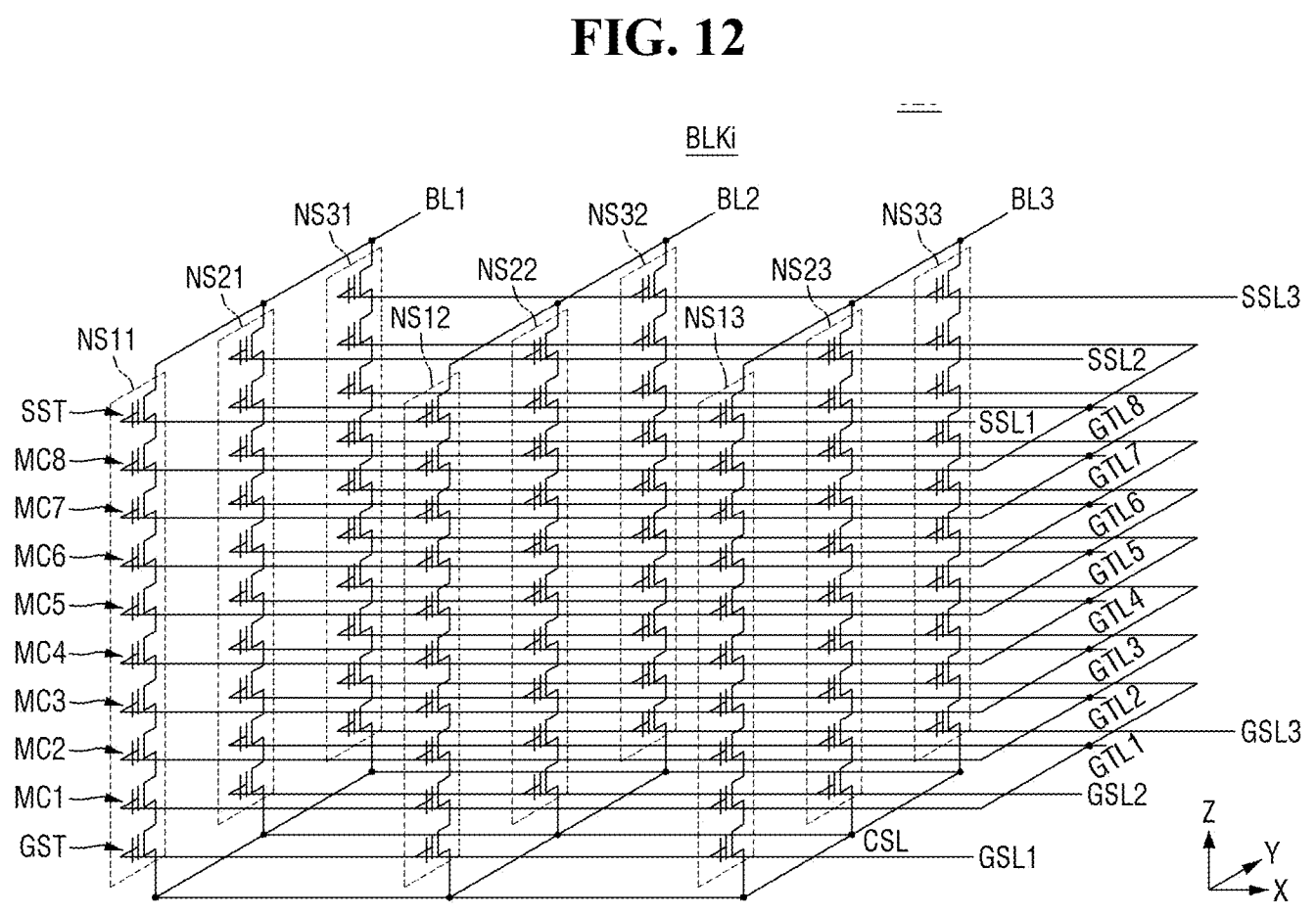

FIG. 12 is a view illustrating a 3D V-NAND structure applicable to a non-volatile memory. When a storage module of the storage device is implemented as a 3D V-NAND type flash memory, each of a plurality of memory blocks constituting the storage module may be represented by an equivalent circuit shown in FIG. 12.

A memory block BLKi shown in FIG. 12 represents a three-dimensional memory block formed on a substrate in a three-dimensional structure. For example, a plurality of memory NAND strings included in the memory block BLKi may be formed in a direction perpendicular to the substrate.

Referring to FIG. 12, the memory block BLKi may include a plurality of memory NAND strings NS11 to NS33 connected between bit lines BL1, BL2, and BL3 and a common source line CSL. Each of the plurality of memory NAND strings NS11 to NS33 includes a string selection transistor SST, a plurality of memory cells MC1, MC2, . . . , MC8, and a ground selection transistor GST. Although FIG. 12 shows that each of the plurality of memory NAND strings NS11 to NS33 includes eight memory cells MC1, MC2, . . . , MC8, the present disclosure is not limited thereto.

The string selection transistor SST may be connected to a corresponding string selection line SSL1, SSL2 or SSL3. The plurality of memory cells MC1, MC2, . . . , MC8 may be connected to corresponding gate lines GTL1, GTL2, . . . , GTL8, respectively. The gate lines GTL1, GTL2, . . . , GTL8 may correspond to the word lines, and a portion of the gate lines GTL1, GTL2, . . . , GTL8 may correspond to a dummy word line. The ground selection transistor GST may be connected to a corresponding ground selection line GSL1, GSL2 or GSL3. The string selection transistor SST may be connected to a corresponding bit line BL1, BL2 or BL3, and the ground selection transistor GST may be connected to the common source line CSL.

The word lines (e.g., WL1) of the same height may commonly be connected, and the ground selection lines GSL1, GSL2 and GSL3 and the string selection lines SSL1, SSL2 and SSL3 may be separated from one another. Although FIG. 12 shows that the memory block BLK is connected to eight gate lines GTL1, GTL2, . . . , GTL8 and three bit lines BL1, BL2 and BL3, the present disclosure is not limited thereto.

Figure 13:
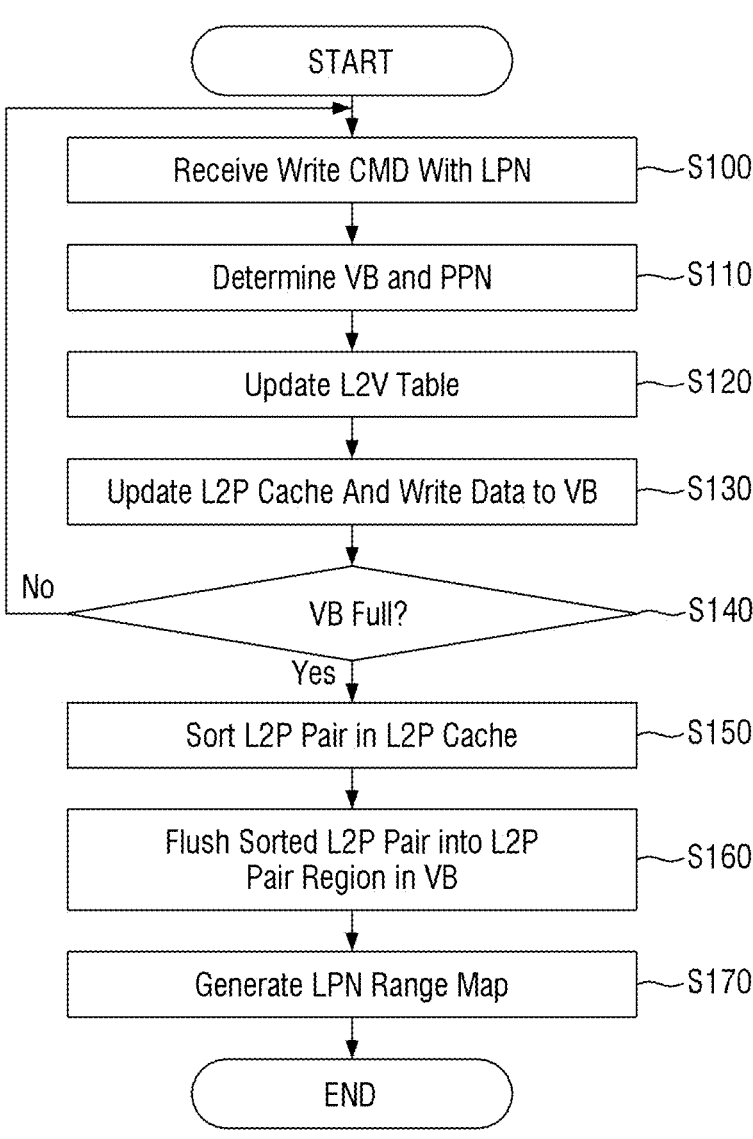
FIG. 13 is a flow chart illustrating an example of a write operation of a storage device.
Figure 14A:
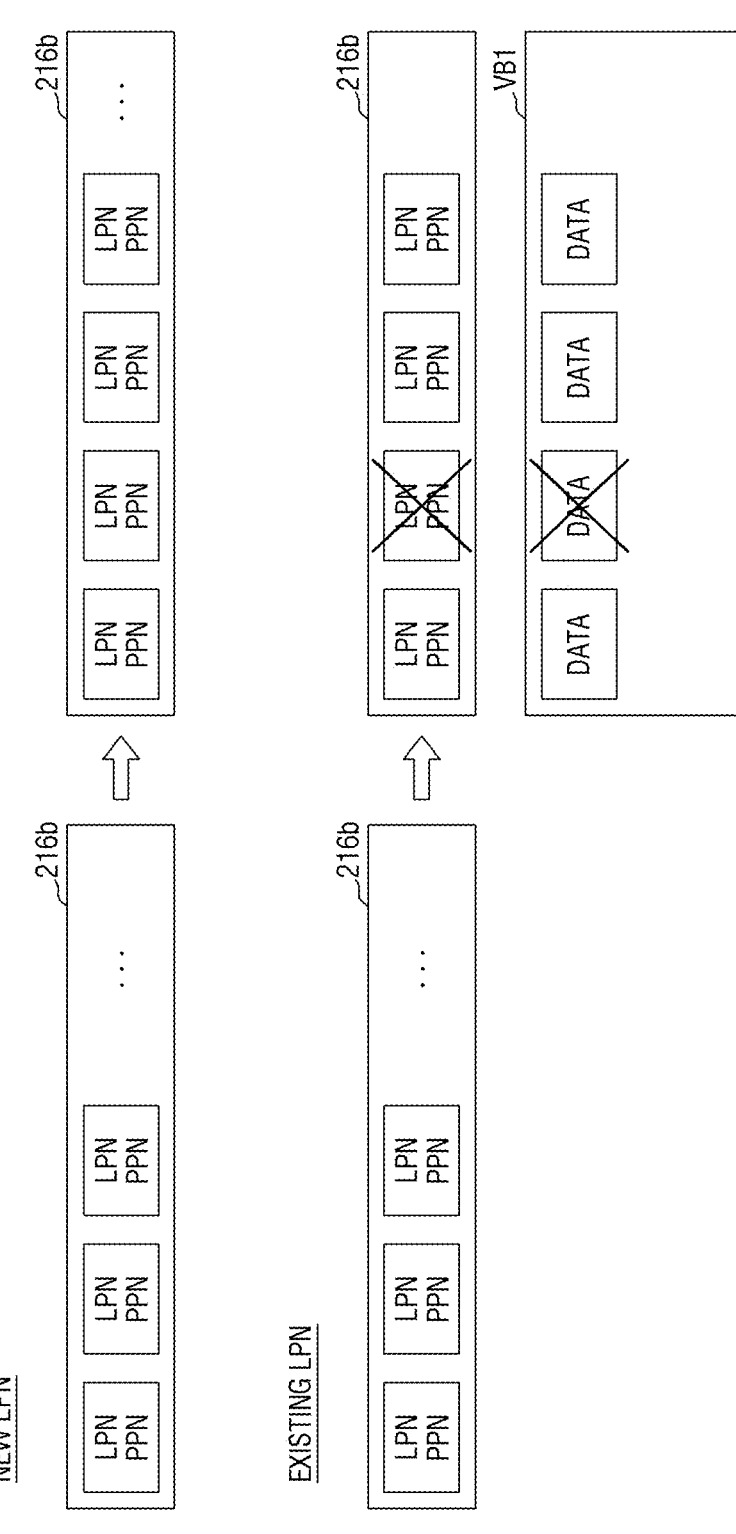
FIGS. 14A, 14B, and 15 are views illustrating an example of an operation of the storage device of FIG. 13.
Figure 14B:
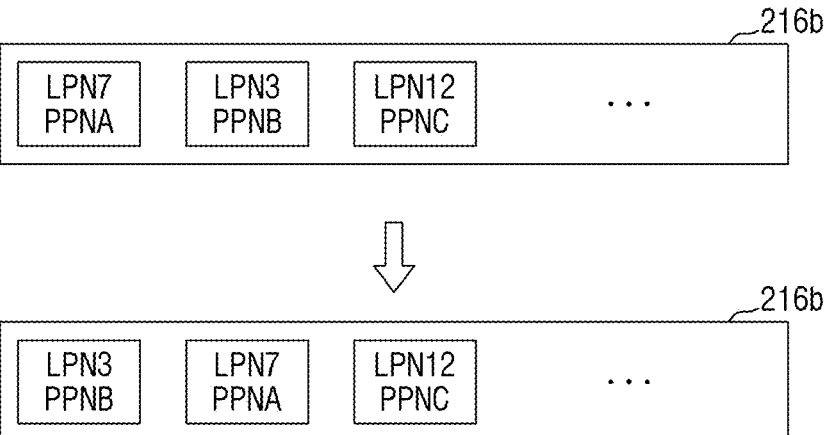
Figure 15:
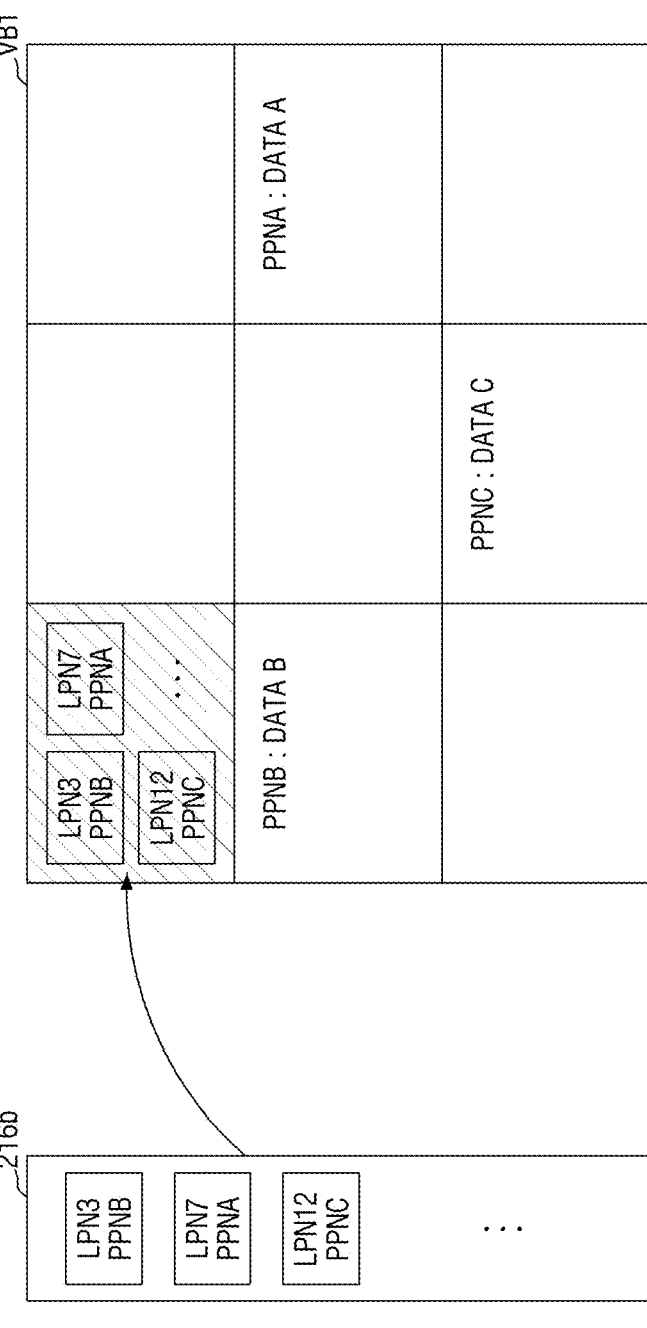

FIG. 13 is a flow chart illustrating an example of a write operation of a storage device. FIGS. 14A, 14B, and 15 are views illustrating operations from the flow chart of FIG. 13.

Referring to FIG. 13, a write command is received together with an LPN (S100).

For example, referring to FIG. 1, the storage controller 210 may receive a write command, which instructs to write data in a region addressed to the first LPN, from the host device 100.

Then, referring to FIG. 13, a virtual block and a PPN, which correspond to the LPN, are determined (S110), and an L2V table is updated (S120).

For example, referring to FIGS. 1 and 3, the storage controller 210 determines a virtual block that will store data addressed to the first LPN, and determines a PPN addressing a storage position of the determined virtual block. The storage controller 210 updates the L2V table 216a so that the first LPN corresponds to the determined virtual block.

Referring to FIG. 13, the L2P cache is updated, and the data is written in the virtual block (S130).

For example, referring to FIGS. 1 and 14A, the storage controller 210 may update the L2P cache 216b for the determined virtual block, add the LPN-PPN pair to the L2P cache 216b when the first LPN received from the host device 100 is a new LPN, invalidate the previously stored LPN- PPN pair when the first LPN received from the host device 100 is an LPN existing in the L2P cache 216*b*, and add the LPN-PPN pair to the L2P cache 216*b*. Therefore, a valid LPN-PPN pair and an invalid LPN-PPN pair may coexist and be stored in the L2P cache 216*b* for the virtual block that is not closed.

Referring to FIGS. 1, 7, and 8, the storage controller 210 writes the data received from the host device 100 in a position addressed to the determined PPN of the data region DR of the determined virtual block.

Then, referring to FIG. 13, it is determined whether the determined virtual block is in a full state (S140).

When the determined virtual block is not in a full state (S140—No), the corresponding virtual block is not closed. Therefore, the step S100 is performed again.

When the determined virtual block is in a full state (S140—Yes), the corresponding virtual block is closed. Therefore, the LPN-PPN pair of the L2P cache for the virtual block that is closed is aligned (S150).

For example, referring to FIGS. 1 and 14B, the storage controller 210 may align the LPN-PPN pair of the L2P cache 216*b* for the virtual block required to be closed, so that the LPN value is aligned in an ascending order.

In the example shown in FIG. 14B, the LPN-PPN pair may be aligned in the order of LPN3, LPN7, and LPN12. In the present example, aligning the LPN-PPN pair as above is to facilitate LPN search.

When the LPN-PPN pair is stored in the L2P pair region of a virtual block, which is closed, in a state that it is not aligned, it may be necessary to search all of the L2P pair region of the virtual block to retrieve the LPN received from the host device 100. That is, the LPN search time may be O(n).

However, as in the present example, when the LPN-PPN pair is aligned and stored in the L2P pair region of the virtual block, the LPN search time may be shortened from O(n) to O(log n).

Then, referring to FIG. 13, the aligned LPN-PPN pair is flushed to the L2P pair region of the virtual block required to be closed (S160).

For example, referring to FIGS. 1 and 15, the storage controller 210 may flush the aligned LPN-PPN pair stored in the L2P cache 216*b* to the L2P pair region of the virtual block VB1 required to be closed.

In this case, in the data region of the virtual block VB, data may be stored at a position addressed to each PPN of the L2P pair region through the above-described operation.

Then, referring to FIG. 13, an LPN range map for a closed virtual block is generated (S170).

For example, referring to FIGS. 1 and 5, the storage controller 210 may divide the LPNs stored in the L2P pair region of the closed virtual block into portions of a page size and generate an LPN range map 216*c* for the closed virtual block by using, for example, the last LPN of each page.

The LPN range map 216*c* may be used when the storage controller 210 retrieves the PPN corresponding to the LPN received from the host device 100, so it is possible to specify the page of the L2P pair region in which the received LPN value is stored. Therefore, it is possible to retrieve the PPN corresponding to the LPN received from the host device 100 by searching for only the LPN-PPN pair stored in the specified page. Therefore, the performance of the storage device can be improved while implementing the L2P map in an on-demand loading manner.

Figure 16:
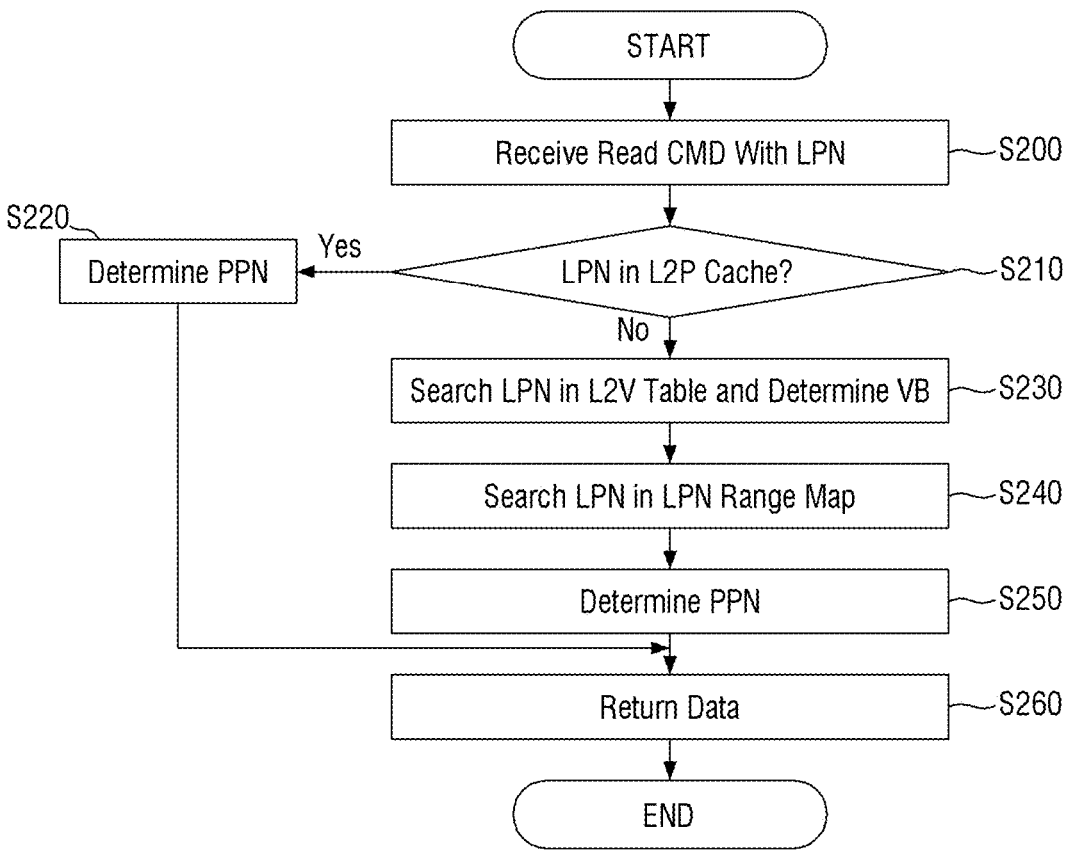
FIG. 16 is a flow chart illustrating an example of a read operation of a storage device.

FIG. 16 is a flow chart illustrating an example of a read operation of a storage device.

Referring to FIG. 16, a read command is received together with an LPN (S200).

For example, referring to FIG. 1, the storage controller 210 may receive, from the host device 100, a read command with instructions to read data stored in a region addressed to the first LPN.

Then, referring to FIG. 16, the storage device determines whether the LPN is present in the L2P cache (S210).

When the first LPN is present in the L2P cache (S210—Yes), this means that the data addressed to the first LPN received from the host device 100 is stored in the virtual block that is not closed. Therefore, the storage controller 210 determines a PPN corresponding to the first LPN received from the host device 100 in the L2P cache 216*b* (S220).

When the first LPN is not present in the L2P cache (S210—No), this means that the data addressed to the first LPN received from the host device 100 is stored in the closed virtual block. Therefore, the storage controller 210 searches for a VBN corresponding to the first LPN from the L2V table to determine a virtual block in which data addressed to the first LPN received from the host device 100 is stored (S230).

Then, referring to FIG. 16, the LPN is searched in the LPN range map (S240), and a PPN corresponding to the LPN is determined (S250).

For example, referring to FIGS. 1 and 5, the storage controller 210 searches, in the LPN range map of the determined virtual block, which page of the L2P pair region of the virtual block stores the first LPN received from the host device 100. When the search is completed, the storage controller 210 determines a PPN corresponding to the first LPN received from the host device 100 in the searched page of the L2P pair region of the virtual block.

Then, referring to FIG. 16, data returns to the host device (S260).

For example, referring to FIG. 1, the storage controller 210 reads the data stored in the position addressed to the determined PPN from the non-volatile memory 220 and returns the data to the host device 100.

Next, a garbage collection operation of the storage device according to some embodiments will be described with reference to FIG. 17.

Figure 17:
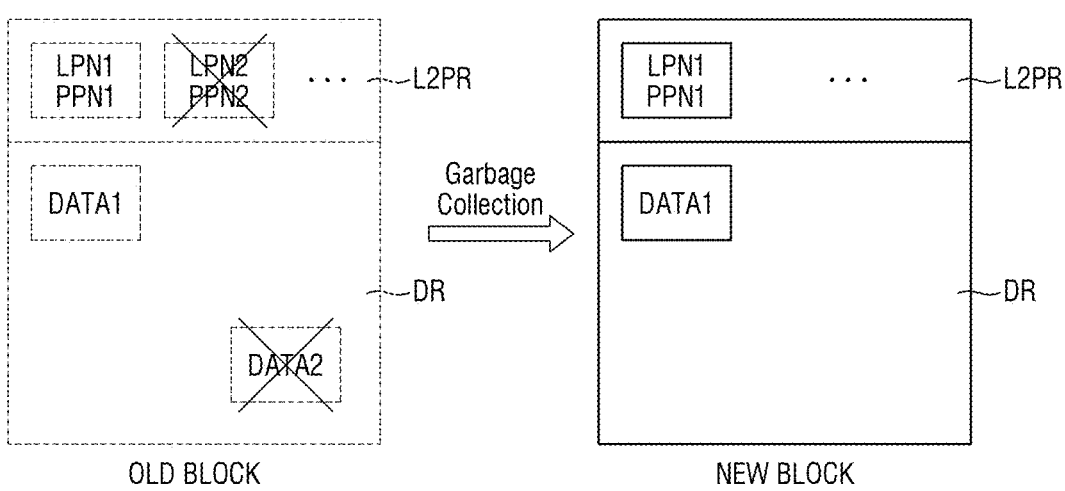
FIG. 17 is a flow chart illustrating an example of a garbage collection operation of a storage device.

FIG. 17 is a flow chart illustrating a garbage collection operation of a storage device.

Referring to FIGS. 1 and 17, when the storage controller 210 determines a garbage collection for an old virtual block OLD BLOCK, the storage controller 210 may migrate a valid LPN-PPN pair stored in the L2P pair region L2PR of the old virtual block OLD BLOCK to an L2P pair region L2PR of a new virtual block NEW BLOCK, and may migrate valid data stored in a data region DR of the old virtual block OLD BLOCK to a data region DR of the new virtual block NEW BLOCK. Therefore, when the stored data is migrated, since the LPN-PPN pair corresponding to the stored data is also migrated, a separate garbage collection operation for the LPN-PPN pair can be avoided. As a result, it is possible to improve performance of the storage device while implementing the L2P map in an on-demand loading manner.

FIG. 18 is a block diagram illustrating an electronic device.

Referring to FIG. 18, an electronic device 601 in a network environment 600 may perform communication with an electronic device 602 through a first network 698 such as a short-range wireless communication network or may perform communication with an electronic device 604 or a server 608 through a second network 699 such as a long-range wireless communication network. In some implementations, the electronic device 601 may be, for example, a notebook computer, a laptop computer, a portable mobile terminal, etc., but the present disclosure is not limited thereto.

The electronic device 601 may perform communication with the electronic device 604 through the server 608. The electronic device 601 includes a processor 620, a memory 630, an input device 650, a sound output device 655, a display device 660, an audio module 670, a sensor module 676, an interface 677, a connecting terminal 678, a haptic module 679, a camera module 680, a power management module 688, a battery 689, a communication module 690, a subscriber identification module (SIM) 696, an antenna module 697, or the like.

In some implementations, at least one of the components such as the display device 660 or the camera module 680 may be omitted from the electronic device 601, or one or more other components may be added to the electronic device 601.

In some implementations, some of the components may be integrated into a single integrated circuit (IC). For example, the sensor module 676 such as a fingerprint sensor, an iris sensor and an illuminance sensor may be embedded in the display device such as a display.

The processor 620 may perform a variety of data processing or computations by executing software (e.g., program 640) for controlling other components of at least one electronic device 601 such as hardware or software components connected to the processor 620.

As at least a portion of data processing or computations, the processor 620 may load commands or data received from another component such as the sensor module 676 or the communication module 690 in a volatile memory 632, process the commands or data stored in the volatile memory 632 and store result data in a non-volatile memory 634.

The processor 620 may include a main processor 621 such as a central processing unit (CPU) or an application processor (AP), and an auxiliary processor 623 operated independently of the main processor 621 or operated as being associated with the main processor 621.

The auxiliary processor 623 may include, for example, a graphic processing unit (GPU), an image signal processor (ISP), a sensor hub processor or a communication processor (CP).

In some implementations, the auxiliary processor 623 may be configured to consume less power than the main processor 621 or execute a particular function. The auxiliary processor 623 may be implemented separately from the main processor 621 or implemented as a portion of the main processor 621.

The auxiliary processor 623 may control at least some functions or states related to at least one of the components of the electronic device 601 on behalf of the main processor 621 while the main processor 621 is in an inactive state or together with the main processor 621 while the main processor 621 is in an active state.

The memory 630 may store various data used for at least one component of the electronic device 601. The data may include, for example, software of the program 640, and input data and output data for commands related to the software. The memory 630 may include a volatile memory 632 or a non-volatile memory 634. The memory 630 may include a volatile memory 632 and a non-volatile memory 634. The non-volatile memory 634 may include an internal memory 636 and an external memory 638. In some implementations, the non-volatile memory 634 may include the above-described storage device (storage device 200 of FIG. 1).

The program 640 may be stored as software in the memory 630, and may include, for example, an operating system (OS) 642, a middleware 644, or an application 646.

The input device 650 may receive commands or data to be used for another component of the electronic device 601 from the outside of the electronic device 601. The input device 650 may include, for example, a microphone, a mouse, or a keyboard.

The sound output device 655 may output a sound signal to the outside of the electronic device 601. The sound output device 655 may include, for example, a speaker. Multimedia data may be output through the speaker.

The display device 660 may visually provide information to the outside of the electronic device 601. The display device 660 may include, for example, a display, a hologram device or a projector, and a control circuit for controlling a corresponding one of the display, the hologram device or the projector.

In some implementations, the display device 660 may include a touch circuit configured to sense a touch, or a sensor circuit, such as a pressure sensor, configured to measure strength of a force generated by the touch.

The audio module 670 may convert sound into an electrical signal, or vice versa. In some implementations, the audio module 670 may obtain sound via the input device 650, or may output sound via the sound output device 655 or a headphone of the external electronic device 602 directly or wirelessly connected to the electronic device 601.

The sensor module 676 may sense an operating state (e.g., power or temperature) of the electronic device 601 or an external environment state (e.g., user state) of the electronic device 601, and may generate an electrical signal or data value corresponding to the sensed state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more prescribed protocols to be used by the electronic device 601 directly or wirelessly connected to the external electronic device 602. In some implementations, the interface 677 may include, for example, a high definition multimedia interface (HDMI), a universal serial bus (USB) interface, a secure digital (SD) card interface, or an audio interface.

The connecting terminal 678 may include a connector through which the electronic device 601 may be physically connected to the external electronic device 602. In some implementations, the connecting terminal 678 may include, for example, an HDMI connector, a USB connector, an SD card connector, or an audio connector (e.g., a headphone connector).

The haptic module 679 may convert an electrical signal into a mechanical stimulus, such as vibration or motion, which may be recognized by a user, through a tactile sensation or kinesthetic sensation. In some implementations, the haptic module 679 may include, for example, a motor, a piezoelectric element, or an electrical stimulator.

The camera module 680 may capture a still image and motion images. In some implementations, the camera module 680 may include one or more lenses, an image sensor, an image signal processor, or a flash.

The power management module 688 may manage a power supplied to the electronic device 601. For example, the power management module 688 may be implemented as at least a portion of a power management integrated circuit (PMIC), for example.

The battery 689 may supply a power to at least one component of the electronic device 601. According to one embodiment, the battery 689 may include, for example, a non-rechargeable primary battery, a rechargeable secondary battery, or a fuel cell.

The communication module 690 may support establishment of a direct communication channel or wireless communication channel between the electronic device 601 and the external electronic device (e.g., the electronic device 602, the electronic device 604, or the server 608), and may perform communication through the established communication channel.

The communication module 690 may include one or more communication processors that are operable independently of the processor 620 and support direct communication or wireless communication.

In some implementations, the communication module 690 may include a wireless communication module 692 such as a cellular communication module, a short-range wireless communication module or a global navigation satellite system (GNSS) communication module, or a wired communication module 694 such as a local region network (LAN) communication module or a power line communication (PLC) module.

A corresponding communication module of these communication modules may perform communication with the external electronic device via the first network 698 (e.g., Bluetooth™, wireless fidelity (Wi-Fi) direct or standard of the Infrared Data Association (IrDA)) or the second network 699 (e.g., a mobile communication network, internet, a long-range communication network, etc.).

These various types of communication modules may be implemented as a single component, or may be implemented as a plurality of components separated from each other. The wireless communication module 692 may identify or authenticate the electronic device 601 within a communication network, such as the first network 698 or the second network 699, by using subscriber information (e.g., international Mobile Subscriber Identifier (IMSI)) stored in the subscriber identification module 696.

The antenna module 697 may transmit or receive a signal or power to or from the outside of the electronic device 601. In some implementations, the antenna module 697 may include one or more antennas, and at least one antenna suitable for a communication scheme used in the communication network, such as the first network 698 or the second network 699, may be selected from the antennas by the communication module 690. Then, a signal or power may be transmitted or received between the communication module and the external electronic device via the selected at least one antenna.

At least some of the components described above may be interconnected to communicate signals therebetween via an inter-peripheral communication scheme such as bus, general purpose input and output (GPIO), serial peripheral interface (SPI) and mobile industry processor interface (MIPI).

In some implementations, commands or data may be transmitted or received between the electronic device 601 and an external electronic device 604 via the server 608 connected to the second network 699. The electronic devices 602 and 604 may be the same or different kinds of devices as or from the electronic device 601. All or some of the operations to be executed in the electronic device 601 may be executed in one or more external electronic devices 602 and 604. For example, all or some of the operations to be executed in the electronic device 601 may be executed in one or more external electronic devices 602 and 604.

For example, when the electronic device 601 needs to perform functions or services automatically or in response to a request from a user or another device, the electronic device 601 may request one or more external electronic devices to perform at least a portion of the functions or services instead of executing the functions or services by themselves. The one or more external electronic devices that have received the request may execute at least a portion of the requested functions or services, or an additional function or service associated with the request, and may forward the result of the execution to the electronic device 601. The electronic device 601 provides the result as at least a portion of the response to the request with or without additional process of the result. To this end, cloud computing, distributed computing or client-server computing technologies may be used, for example.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a combination can in some cases be excised from the combination, and the combination may be directed to a subcombination or variation of a subcombination.

Although the embodiments of the present disclosure have been described with reference to the accompanying drawings, it will be apparent to those skilled in the art that the present disclosure can be fabricated in various forms without being limited to the above-described embodiments and can be embodied in other specific forms without departing from technical spirits and essential characteristics of the present disclosure. Thus, the above embodiments are to be considered in all respects as illustrative and not restrictive.

What is claimed is:

1. A storage device comprising:
   a non-volatile memory including a first virtual block and a second virtual block, each of the first and second virtual blocks including:
      a logical page number to physical page number (L2P) pair region configured to store a pair of a logical page number (LPN) and a physical page number (PPN) (LPN-PPN pair), and
      a data region configured to store data addressed to the PPN;
   a volatile memory including:
      a logical page number to virtual block number (L2V) table configured to store a virtual block number (VBN) corresponding to the LPN,
      an L2P cache configured to store the LPN-PPN pair, and
      an LPN range map; and
   a controller configured to control the non-volatile memory and the volatile memory,
   wherein the first virtual block is closed, and the second virtual block is not closed,
   wherein the L2P cache is configured to store the LPN-PPN pair of the second virtual block, and wherein the LPN range map is configured to store LPNs corresponding to a portion of the LPN-PPN pair stored in the L2P pair region of the first virtual block.

2. The storage device of claim 1, wherein each of the first and second virtual blocks includes a plurality of physical blocks, wherein the plurality of physical blocks include a single level cell (SLC) block including an SLC and a multi level cell (MLC) heap block including (MLC), and wherein the L2P pair region is disposed in the SLC block.

3. The storage device of claim 1, wherein each of the first and second virtual blocks includes a first portion connected to an SLC word line and a second portion connected to a multi level cell (MLC) word line, and wherein the L2P pair region is disposed in the first portion.

4. The storage device of claim 1, wherein the L2P pair region includes first and second pages, and wherein the LPN range map includes one of a first plurality of LPNs stored in the first page and one of a second plurality of LPNs stored in the second page.

5. The storage device of claim 1, wherein the controller is configured to, based on receiving, from a host device, a write command instructing to write first data in a region addressed to a first LPN:

determine a position addressed to a first PPN of the second virtual block as a position for storing first data, update the L2V table based on data indicative of the determined position, generate a first LPN-PPN pair configured to allow the first PPN to correspond to the first LPN of the second virtual block, update the L2P cache based on the first LPN-PPN pair, and store the first data in a position addressed to the first PPN of the second virtual block.

6. The storage device of claim 5, wherein the controller is configured to flush the LPN-PPN pair stored in the L2P cache to an L2P pair region of the second virtual block based on the second virtual block being determined to be full based on the LPN-PPN pair stored in the L2P cache and the data stored in the data region of the second virtual block.

7. The storage device of claim 6, wherein the controller is configured to align the LPN-PPN pair stored in the L2P cache based on the LPN before flushing the LPN-PPN pair stored in the L2P cache to the L2P pair region of the second virtual block.

8. The storage device of claim 7, wherein the controller is configured to generate the LPN range map for the second virtual block based on the aligned LPN-PPN pair.

9. The storage device of claim 1, wherein the controller is configured to, based on receiving, from a host device, a read command that instructs to read data stored in a region addressed to a first LPN:

determine whether the first LPN is present in the L2P cache, based on the first LPN being present in the L2P cache, determine a PPN corresponding to the first LPN in the L2P cache, and return, to the host device, data that is stored in a position addressed to the determined PPN, and based on the first LPN for not being present in the L2P cache, determine a VBN corresponding to the first LPN in the L2V table, determine a PPN corresponding to the first LPN in the L2P pair region of either of the first or second virtual block corresponding to the determined VBN, and return, to the host device, data that is stored in a position addressed to the determined PPN.

10. The storage device of claim 9, wherein the controller is configured to search for the first LPN in the LPN range map for either of the first or second virtual block corresponding to the determined VBN, and access, based on searching for the first LPN, the L2P pair region of either of the first or second virtual block corresponding to the determined VBN.

11. The storage device of claim 1, wherein the virtual block includes a third virtual block and a fourth virtual block, and wherein controller is configured to, in response to determining a garbage collection for the third virtual block, migrate a valid LPN-PPN pair stored in an L2P pair region of the third virtual block to an L2P pair region of the fourth virtual block and migrate valid data stored in the data region of the third virtual block to the data region of the fourth virtual block.

12. A storage device comprising:

a non-volatile memory including a first virtual block, a second virtual block, a third virtual block that is not closed and a fourth virtual block that is closed;

a volatile memory; and a controller connected to the non-volatile memory and the volatile memory, wherein each of the first, second, third and fourth virtual blocks includes (i) a logical page number to physical page number (L2P) pair region configured to store a pair of a logical page number (LPN) and a physical page number (PPN) (LPN-PPN pair) and (ii) a data region storing data addressed to the PPN, and wherein the controller is configured to, based on determining a garbage collection for the first virtual block, migrate a valid LPN-PPN pair stored in the L2P pair region of the first virtual block to the L2P pair region of the second virtual block and migrate valid data stored in the data region of the first virtual block to the data region of the second virtual block, wherein the volatile memory includes:

an L2P cache configured to store the LPN-PPN pair of the third virtual block, and an LPN range map configured to store LPNs corresponding to a portion of the LPN-PPN pair stored in the L2P pair region of the fourth virtual block.

13. The storage device of claim 12, wherein the controller is configured to, in response to the storage device determining that the third virtual block of the virtual blocks of the non-volatile memory is full based on the LPN-PPN pair and the data addressed to the PPN, flush the LPN-PPN pair stored in the L2P cache to the L2P pair region of the third virtual block.

14. The storage device of claim 13, wherein the third virtual block includes a first portion connected to an SLC word line and a second portion connected to an MLC word line, and wherein the controller is configured to flush the LPN-PPN pair to the first portion.

15. An operating method of a storage device comprising a volatile memory, a non-volatile memory including a virtual block that is not closed and having a logical page number to physical page number (L2P) pair region storing a logical page number and a physical page number (LPN-PPN) pair and a data region configured to store data addressed to the PPN, and a controller for controlling the volatile memory and the non-volatile memory, the operating method comprising:

receiving, from a host device, a write command with instructions to write first data in a region addressed to a first LPN;

determining a position addressed to a first PPN of the virtual block addressed to a first virtual block number (VBN) is a position for storing the first data;

based on the determined position, i) storing a pair of the first LPN and the first VBN in an L2V table of the volatile memory and ii) storing a pair of the first LPN and the first PPN in an L2P cache of the volatile memory;

storing the first data in the position addressed to the first PPN of the virtual block; and determining that the virtual block is full based on the LPN-PPN pair stored in the L2P cache and the data stored in the data region of the virtual block; and based on the determination that the virtual block is full, flushing the LPN-PPN pair stored in the L2P cache to the L2P pair region of the virtual block, and generating an LPN range map for the virtual block in the volatile memory storing LPNs corresponding to a portion of the LPN-PPN pair stored in the L2P pair region of the virtual block.

16. The operating method of claim 15, further comprising aligning the LPN-PPN pair stored in the L2P cache based on the LPN before flushing the LPN-PPN pair stored in the L2P cache to the L2P pair region of the virtual block.

17. The operating method of claim 16, further comprising generating the LPN range map for the virtual block in the volatile memory based on the aligned LPN-PPN pair.

18. The operating method of claim 17, wherein the L2P pair region of the virtual block includes first and second pages, and wherein the LPN range map includes one of a first plurality of LPNs stored in the first page and one of a second plurality of LPNs stored in the second page.

19. The operating method of claim 15, wherein the virtual block includes a plurality of physical blocks, wherein the plurality of physical blocks include a single level cell (SLC) block including an SLC and a multi level cell (MLC) block including an MLC, and wherein the L2P pair region is disposed in the SLC block.

20. The operating method of claim 15, wherein the virtual block includes a first portion connected to an SLC word line and a second portion connected to an MLC word line, and wherein the L2P pair region is disposed in the first portion.

* * * * *